(12) United States Patent
Aida et al.

(10) Patent No.: US 7,514,132 B2
(45) Date of Patent: Apr. 7, 2009

(54) MULTILAYER LAMINATE

(75) Inventors: Shigeru Aida, Ichihara (JP); Tsuyoshi Iwasa, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/432,400

(22) Filed: May 12, 2006

(65) Prior Publication Data

US 2007/0056681 A1 Mar. 15, 2007

Related U.S. Application Data

(63) Continuation of application No. PCT/JP2005/000252, filed on Jan. 12, 2005.

(30) Foreign Application Priority Data

Jan. 13, 2004 (JP) .............................. 2004-005585

(51) Int. Cl.
- *B32B 1/08* (2006.01)
- *B32B 27/08* (2006.01)
- *B32B 27/18* (2006.01)
- *B32B 27/30* (2006.01)

(52) U.S. Cl. .................... 428/36.91; 428/339; 428/421; 156/244.11

(58) Field of Classification Search ............. 428/36.91, 428/411.1, 421, 480, 500, 523, 524

See application file for complete search history.

(56) References Cited

U.S. PATENT DOCUMENTS 6,881,460 B2 * 4/2005 Inaba et al. ............. 428/36.91

2002/0147272 A1 * 10/2002 Lee et al. ..................... 525/71
2003/0099799 A1 5/2003 Koike et al.

FOREIGN PATENT DOCUMENTS

| JP | 10-311461 | 11/1998 |
| JP | 2002-357285 | 12/2002 |
| JP | 2004-285905 | 10/2004 |
| WO | WO 0158686 A1 * | 8/2001 |
| WO | 01/65161 | 9/2001 |
| WO | WO 0181077 A1 * | 11/2001 |

OTHER PUBLICATIONS

Machine assisted translation of JP 10-311,461, Nov. 1998.*
English translation of JP 10-311461, Nov. 1998.*
English translation of Inaba et al., WO01/058686, Aug. 2001.*
U.S. Appl. No. 11/580,975, filed Oct. 16, 2006, Funaki, et al.
U.S. Appl. No. 11/432,400, filed May 12, 2006, Aida, et al.
U.S. Appl. No. 11/955,979, filed Dec. 13, 2007, Aida, et al.

* cited by examiner

*Primary Examiner*—Ramsey Zacharia
(74) *Attorney, Agent, or Firm*—Oblon, Spivak, McClelland, Maier & Neustadt, P.C.

(57) ABSTRACT

To provide a multilayer laminate excellent in fuel barrier properties, fuel oil resistance, mechanical strength and interlaminar adhesion strength.

A multilayer laminate having a layer of a fluororesin containing acid anhydride residue (for example, a tetrafluoroethylene/ethylene/(perfluoroethyl)ethylene/itaconic anhydride copolymer) and a layer of an amine-modified thermoplastic resin (for example, polyphenylene sulfide modified by a silane coupling agent containing an amino group). The multilayer laminate can be produced by co-extrusion and is excellent in the interlaminar adhesion strength, whereby it is suitable for a fuel hose or the like.

19 Claims, No Drawings

MULTILAYER LAMINATE

TECHNICAL FIELD

The present invention relates to a multilayer laminate excellent in fuel barrier properties, fuel oil resistance, mechanical strength and interlaminar adhesion strength.

BACKGROUND ART

A fluoropolymer (hereinafter referred to also as a fluororesin) such as polytetrafluoroethylene, a tetrafluoroethylene/perfluoro(alkyl vinyl ether) type copolymer or an ethylene/tetrafluoroethylene type copolymer, is excellent in e.g. heat resistance, chemical resistance, oil resistance, weather resistance, gas barrier properties, fuel barrier properties, release properties, non-tackiness and antifouling properties, and it is employed in various fields such as semiconductor industries and automobile industries. Along with the expansion of its use, in a case where improvement in mechanical strength of the fluororesin, cost down or the like is required, a multilayer laminate of a fluororesin and e.g. a thermoplastic resin other than the fluororesin, which is excellent in mechanical strength, has been studied.

Particularly, a fuel transfer hose for automobiles is required to have fuel barrier properties, fuel oil resistance, mechanical strength and the like, and therefore a multilayer laminated hose has been proposed, in which a fluororesin having excellent fuel barrier properties and fuel oil resistance is used as an internal layer and polyamide having excellent mechanical strength is used as an external layer (e.g. JP-A-2-107371 and JP-A-5-8353). In order to meet reinforcement of regulations against emission gas in the future, a multilayer laminated hose has been proposed, in which an interlayer of a thermoplastic resin having remarkably excellent fuel barrier properties is interposed between a fluororesin and a polyamide (e.g. JP-A-2003-127256 and JP-A-2000-329266). The thermoplastic resin constituting the interlayer may, for example, be polyphenylene sulfide, polyethylene terephthalate, polybutylene terephthalate or polyethylene naphthalate. However, such a multilayer laminated hose is insufficient in adhesive strength between the fluororesin layer and the thermoplastic resin layer as an interlayer.

Further, a multilayer laminated film made of a fluororesin and a thermoplastic resin is well known (e.g. JP-A-2002-67241 and JP-A-2001-138338), and its application to e.g. a release film has been proposed. However, said multilayer laminated film is produced by a process wherein the surface of a fluororesin film is subjected to corona treatment, then an adhesive is applied thereto, and then a thermoplastic resin film is laminated thereon, and thus, its productivity is not high.

DISCLOSURE OF THE INVENTION

Object to be Accomplished by the Invention

It is an object of the present invention to provide a multilayer laminate excellent in interlaminar adhesion strength and productivity, which has been desired to be developed on the basis of the above background.

Means for Accomplish the Object

The present invention is to solve the above-mentioned problems and provides the following:

(1) A multilayer laminate characterized in that it has a laminate structure having a layer of a fluororesin containing acid anhydride residue and a layer of an amine-modified thermoplastic resin, directly laminated.

(2) The multilayer laminate according to the above (1), wherein the fluororesin is an ethylene/tetrafluoroethylene type copolymer.

(3) The multilayer laminate according to the above (1) or (2), wherein the content of the acid anhydride residue in the fluororesin is from 0.01 to 3 mol % based on the total polymerized units constituting the fluororesin.

(4) The multilayer laminate according to any one of the above (1) to (3), wherein the fluororesin is a fluoropolymer obtained by copolymerizing a fluoromonomer with an acid anhydride having a polymerizable unsaturated bond.

(5) The multilayer laminate according to the above (4), wherein the acid anhydride having a polymerizable unsaturated bond is at least one member selected from the group consisting of maleic anhydride, itaconic anhydride, citraconic anhydride and 5-norbornene-2,3-dicarboxylic anhydride.

(6) The multilayer laminate according to any one of the above (1) to (5), wherein the thermoplastic resin is a resin based on at least one member selected from the group consisting of polyphenylene sulfide, polyethylene terephthalate, polybutylene terephthalate, polyethylene naphthalate, polybutylene naphthalate, a liquid crystal polymer, a polyvinyl alcohol, an ethylene/vinyl alcohol copolymer, an aliphatic polyketone, polyacetal and polyolefin.

(7) The multilayer laminate according to any one of the above (1) to (6), wherein the amine-modified thermoplastic resin is polyphenylene sulfide.

(8) The multilayer laminate according to any one of the above (1) to (7), wherein the amine-modified thermoplastic resin is one produced by melt-kneading a compound having an amino group with a thermoplastic resin.

(9) The multilayer laminate according to the above (8), wherein the compound having an amino group is a silane coupling agent having an amino group.

(10) The multilayer laminate according to any one of the above (1) to (9), wherein the multilayer laminate is a fuel transfer hose.

(11) A method for producing the multilayer laminate as defined in any one of the above (1) to (10), characterized by subjecting a fluororesin containing acid anhydride residue and an amine-modified thermoplastic resin to co-extrusion.

Effect of the Invention

The multilayer laminate of the present invention is remarkably excellent in fuel barrier properties and fuel oil resistance and is excellent in mechanical strength and interlaminar adhesion strength. Further, it is excellent in the productivity of the multilayer laminate. Further, in a case where it has a fluororesin layer at its surface, such a surface is excellent in release properties, non-tackiness, antifouling properties and the like.

BEST MODE OF CARRYING OUT THE INVENTION

The fluororesin containing acid anhydride residue of the present invention is preferably a fluororesin having the acid anhydride residue in the main chain, in the side chain or at the terminal of the polymer. Here, the acid anhydride residue is meant for a functional group having a structure based on an acid anhydride. The content of the acid anhydride residue is preferably from 0.01 to 3 mol %, more preferably from 0.05 to 2 mol %, most preferably from 0.1 to 1 mol % based on the total polymerized units constituting the fluororesin.

A method for introducing acid anhydride residue to a fluororesin may, for example, be a method of copolymerizing a fluoromonomer with an acid anhydride having a polymerizable unsaturated bond (hereinafter referred to as an AM monomer), a method of polymerizing a fluoromonomer in the presence of a polymerization initiator or a chain transfer agent which can introduce the acid anhydride residue to terminals of a polymer, or a method of melting and mixing the AM monomer with a fluororesin in the presence of a radical generator, followed by graft polymerization of the acid anhydride with the fluororesin. It is preferably a method of copolymerizing the fluoromonomer with the AM monomer.

In the present invention, in a case where the fluororesin containing the acid anhydride residue is a fluorocopolymer obtained by copolymerizing a fluoromonomer with the AM monomer, the content of the repeating units based on the AM monomer is preferably from 0.01 to 3 mol %, more preferably from 0.05 to 2 mol %, most preferably from 0.1 to 1 mol %, based on the total polymerized units.

The AM monomer is preferably at least one member selected from the group consisting of maleic anhydride, itaconic anhydride (hereinafter referred to as IAH), citraconic anhydride (hereinafter referred to as CAH) and 5-norbornene-2,3-dicarboxylic anhydride (hereinafter referred to as NAH), more preferably at least one member selected from the group consisting of IAH, CAH and NAH, most preferably IAH.

The above fluorocopolymer may contain repeating units based on a dicarboxylic acid such as itaconic acid, citraconic acid, 5-norbornene-2,3-dicarboxlylic acid or maleic acid, which is obtained by hydrolysis of the AM monomer. In a case where such repeating units based on the above dicarboxylic acid are contained, the repeating units based on the above AM monomer are represented as a total amount of repeating units based on the AM monomer and repeating units based on the dicarboxylic acid.

The fluororesin in the present invention may, for example, be a polymer or copolymer of the fluoromonomer, or a copolymer of the fluoromonomer with a monomer other than the fluoromonomer.

The fluoromonomer may, for example, be tetrafluoroethylene (hereinafter referred to as TFE), trifluoroethylene, vinylidene fluoride (hereinafter referred to as VDF), vinyl fluoride, chlorotrifluoroethylene (hereinafter referred to as CTFE), hexafluoropropylene (hereinafter referred to as HFP), a fluoroolefin such as a compound represented by $CF_2=CFR^f$ (wherein $R^f$ is a $C_{2-10}$ polyfluoroalkyl group) or $CH_2=CX(CF_2)_nY$ (wherein each of X and Y which are independent of each other is a hydrogen or fluorine atom, and n is an integer of from 2 to 8), a perfluoro(alkyl vinyl ether) such as $CF_2=CFO(CF_2)_2F$ or $CF_2=CFO(CF_2)_3F$ (hereinafter referred to as PPVE), or a (polyfluoroalkyl)trifluorovinyl ether containing hydrogen atoms such as $CF_2=CFOCH_2CF_3$. Such a fluoromonomer is preferably at least one member selected from the group consisting of TFE, VDF, PPVE and $CH_2=CX(CF_2)_nY$, more preferably TFE. The fluoromonomers may be used alone or in combination as a mixture of two or more of them.

The above compound represented by $CH_2=CX(CF_2)_nY$ is preferably a compound wherein n=2 to 4. As a specific example, $CH_2=CF(CF_2)_2F$, $CH_2=CF(CF_2)_3F$, $CH_2=CF(CF_2)_4F$, $CH_2=CF(CF_2)_2H$, $CH_2=CF(CF_2)_3H$, $CH_2=CF(CF_2)_4H$, $CH_2=CH(CF_2)_2F$, $CH_2=CH(CF_2)_3F$, $CH_2=CH(CF_2)_4F$, $CH_2=CH(CF_2)_2H$, $CH_2=CH(CF_2)_3H$ or $CH_2=CH(CF_2)_4H$ may be mentioned. Such a compound is preferably $CH_2=CF(CF_2)_2F$, $CH_2=CH(CF_2)_2F$, $CH_2=CH(CF_2)_2H$ or $CH_2=CF(CF_2)_2H$, most preferably $CH_2=CH(CF_2)_2F$. The fluororesin obtained by copolymerization of such compounds is excellent in fuel barrier properties, stress crack resistance and the like.

The monomer other than the fluoromonomer may, for example, be a hydrocarbon type olefin such as ethylene (hereinafter referred to as E), propylene or butene, a vinyl ether such as ethyl vinyl ether, butyl vinyl ether, methyl vinyloxy butyl carbonate or glycidyl vinyl ether, or a vinyl ester such as vinyl acetate, vinyl chloroacetate, vinyl butanoate, vinyl pivalate, vinyl benzoate or vinyl crotonate. Such a monomer is preferably E. The monomers other than the fluoromonomer may be used alone or in combination as a mixture of two or more of them.

As a specific example of the fluororesin, a TFE/E type copolymer, a TFE/HFP type copolymer, TFE/PPVE type copolymer, a TFE/VDF/HFP type copolymer, a TFE/VDF type copolymer or a CTFE/E type copolymer, may be mentioned. It is preferably a TFE/E type copolymer. The TFE/E type copolymer is preferably a TFE/E/$CH_2=CH(CF_2)_4F$ copolymer or a TFE/E/$CH_2=CH(CF_2)_2F$ copolymer, more preferably a TFE/E/$CH_2=CH(CF_2)_2F$ copolymer.

Further, as a preferred specific example of the polymer containing repeating units based on the AM monomer, a TFE/PPVE/IAH copolymer, a TFE/PPVE/CAH copolymer, a TFE/PPVE/NAH copolymer, a TFE/HFP/IAH copolymer, a TFE/HFP/CAH copolymer, a TFE/HFP/NAH copolymer, a TFE/VdF/IAH copolymer, a TFE/VdF/CAH copolymer, a TFE/$CH_2=CH(CF_2)_4F$/IAH/E copolymer, a TFE/$CH_2=CH(CF_2)_4F$/CAH/E copolymer, a TFE/$CH_2=CH(CF_2)_2F$/IAH/E copolymer, a TFE/$CH_2=CH(CF_2)_2F$/CAH/E copolymer, a CTFE/$CH_2=CH(CF_2)_4F$/IAH/E copolymer, a CTFE/$CH_2=CF(CF_2)_4F$/CAH/E copolymer, a CTFE/$CH_2=CH(CF_2)_2F$/IAH/E copolymer, a CTFE/$CH_2=CH(CF_2)_2F$/CAH/E copolymer, a TFE/HFP/PPVE/IAH copolymer, a TFE/HFP/PPVE/CAH copolymer or a TFE/HFP/PPVE/NAH copolymer may be mentioned.

In the TFE/E copolymer, the molar ratio of polymerized units based on TFE/polymerized units based on E is preferably from 30/70 to 70/30, more preferably from 45/55 to 65/35, most preferably from 50/50 to 65/35. If the molar ratio of polymerized units based on TFE/polymerized units based on E is too low, e.g. the heat resistance, weather resistance, chemical resistance, gas barrier properties or fuel barrier properties of the multilayer laminate are insufficient, and if such a molar ratio is too high, e.g. the mechanical strength or melt moldability is insufficient. If the molar ratio is within such a range, the multilayer laminate is excellent in e.g. heat resistance, weather resistance, chemical resistance, gas barrier properties, fuel barrier properties, mechanical strength, melt moldability, etc.

In a case where the TFE/E copolymer contains polymerized units based on a monomer other than TFE and E, the content of polymerized units based on the monomer other than TFE and E is preferably from 0.01 to 20 mol %, more preferably from 0.05 to 15 mol %, most preferably from 0.1 to 10 mol %, based on the total polymerized units in the fluoropolymer.

The volume flow rate (hereinafter referred to as value Q) of the fluororesin in the present invention is preferably from 0.1 to 1,000 mm$^3$/sec, more preferably from 5 to 500 mm$^3$/sec, most preferably from 10 to 200 mm$^3$/sec. The value Q is an index which represents the melt flowability of the fluorocopolymer and may be used as an index for the molecular weight. Namely, the molecular weight is low when the value Q is high, and the molecular weight is high when the value Q is low. The value Q is the extrusion rate of the fluorocopolymer at the time when it is extruded in an orifice having a diameter of 2.1 mm and a length of 8 mm under a load of 7 kg at a temperature higher by 50° C. than the melting point of the fluororesin, by using a Flowtester manufactured by Shimadzu Corporation. If the value Q is within such a range, the fluororesin is excellent in extrusion properties and mechanical strength.

The process for producing the fluororesin in the present invention may, for example, be suspension polymerization, solution polymerization, emulsion polymerization or bulk polymerization. Especially, it is preferably radical polymerization, more preferably solution polymerization wherein a fluoromonomer is polymerized in the presence of a radical polymerization initiator, a chain transfer agent and a polymerization medium.

The radical polymerization initiator is preferably an initiator, of which the temperature at which the half-life is 10 hours, is 0 to 100° C., more preferably from 20 to 90° C. As a specific example, an azo compound such as azobisisobutyronitrile, a peroxydicarbonate such as diisopropyl peroxydicarbonate, a peroxyester such as tert-butyl peroxypivalate, tert-butyl peroxyisobutyrate or tert-butyl peroxyacetate, a non-fluorine type diacyl peroxide such as isobutyryl peroxide, octanoyl peroxide or lauroyl peroxide, a fluorinated diacyl peroxide such as $(Z(CF_2)_pCOO)_2$ (wherein Z is a hydrogen atom, a fluorine atom or a chlorine atom, and p is an integer of from 1 to 10), an inorganic peroxide such as potassium persulfate, sodium persulfate or ammonium persulfate, may be mentioned.

The polymerization medium may, for example, be an organic solvent such as a fluorohydrocarbon, a chlorohydrocarbon, a fluorochlorohydrocarbon, an alcohol or a hydrocarbon, or an aqueous medium. The chain transfer agent may, for example, be an alcohol such as methanol or ethanol, a chlorofluorohydrocarbon such as 1,3-dichloro-1,1,2,2,3-pentafluoropropane or 1,1-dichloro-1-fluoroethane, or a hydrocarbon such as pentane, hexane or cyclohexane. The polymerization conditions are not particularly limited, but the polymerization temperature is preferably from 0 to 100° C., more preferably from 20 to 90° C., the polymerization pressure is preferably from 0.1 to 10 MPa, more preferably from 0.5 to 3 MPa, and the polymerization time is preferably from 1 to 30 hours, more preferably from 2 to 10 hours.

In a case where the multilayer laminate of the present invention is used as a fuel transfer hose, the inner layer contacting the fuel is preferably an inner layer made of a fluororesin having electroconductivity, more preferably an inner layer made of a fluororesin containing electroconductive carbon black. The surface resistivity as an index for the electroconductivity is preferably at most $1 \times 10^9$ Ω/□, particularly preferably at most $1 \times 10^5$ Ω/□.

The thermoplastic resin of the present invention is preferably at least one member selected from the group consisting of polyphenylene sulfide, polyethylene terephthalate, polybutylene terephthalate, polyethylene naphthalate, polybutylene naphthalate, a liquid crystal polymer, a polyvinyl alcohol, an ethylene/vinyl alcohol copolymer, an aliphatic polyketone, a polyacetal and a polyolefin. It is more preferably at least one member selected from the group consisting of polyphenylene sulfide, polyethylene terephthalate, polybutylene terephthalate, polyethylene naphthalate and polybutylene naphthalate.

In the present invention, the amine modification means that a compound having an amino group is reacted with the above thermoplastic resin by means of various methods. Such an amine-modified thermoplastic resin is preferably a thermoplastic resin containing an amino group. The method for the amine modification may, for example, be a method of copolymerizing a monomer having an amino group at the time of producing a thermoplastic resin, a method of introducing amino groups to polymer chain terminals of a thermoplastic resin by using an initiator or chain transfer agent having an amino group at the time of polymerization, a method of graft polymerizing a monomer having an amino group to a thermoplastic resin, a method of introducing amino groups to polymer chain terminals by contacting a thermoplastic resin with ammonia gas, or a method of melt-kneading a thermoplastic resin with a compound having an amino group or a thermoplastic resin having amino groups to introduce amino groups to the thermoplastic resin. Such a method for amine modification is preferably a method of melt-kneading a thermoplastic resin with a compound having an amino group to introduce amino groups to the resin.

The above compound having an amino group may, for example, be a silane coupling agent having an amino group such as 3-aminopropyltriethoxysilane, N-phenyl-3-aminopropyltriethoxysilane, N-(2-aminoethyl)-3-aminopropyltrimethoxysilane or 3-aminopropylmethyldimethoxysilane, a $C_{1-20}$ alkylamine such as n-hexylamine, a $C_{1-20}$ alkylenediamine such as hexamethylenediamine, aminopropyl vinyl ether or 2,2'-azobis(2-methylpropioneamidine)dihydrochloride. It is preferably a silane coupling agent having an amino group.

Especially, it is preferred that polyphenylene sulfide is modified by a silane coupling agent having an amino group. The amount of the silane coupling agent having an amino group at the time of the modification, is preferably from 0.1 to 15 parts by mass, more preferably from 1 to 10 parts by mass, per 100 parts by mass of the polyphenylene sulfide. If the amount is within such a range, the adhesion to the fluororesin containing acid anhydride residue is excellent.

The method for the amine modification is preferably a method of copolymerizing a monomer having an amino group or a method of introducing amino groups to polymer chain terminals of a thermoplastic resin using a chain transfer agent having the amino group at the time of polymerization.

For example, in a case where the thermoplastic resin is polyphenylene sulfide, when the polyphenylene sulfide is produced from 1,4-dichlorobenzene and sodium sulfide, a dichlorobenzene having an amino group (a monomer having an amino group) such as 2,5-dichloroaniline is added thereto, whereby it is possible to obtain polyphenylene sulfide having an amino group at the side chain. Further, by addition of e.g. 4-chloroaniline (a polymerization terminator having an amino group), it is possible to obtain polyphenylene sulfide having amino groups at the terminals. The monomer having an amino group is preferably used in an amount of from 0.05 to 10 mol %, more preferably from 0.1 to 5 mol %, based on 1,4-dichlorobenzene to be used. Further, the chain transfer agent having an amino group is preferably used in an amount of from 0.01 to 10 mol %, more preferably from 0.1 to 5 mol % based on 1,4-dichlorobenzene to be used.

The method for producing the multilayer laminate of the present invention is preferably a method of subjecting a fluororesin containing acid anhydride residue and an amine-modified thermoplastic resin to coextrusion, or a method of laminating a film made of a fluororesin containing acid anhydride residue and a film made of an amine-modified thermoplastic resin. It is more preferably the co-extrusion. In the co-extrusion, the fluororesin and the thermoplastic resin are extruded from extrusion ports of the different extruders and then passed through a die while they are contacted in a molten state, to form a multilayer laminate hose having the fluororesin and the thermoplastic resin directly laminated.

The multilayer laminate of the present invention is excellent in the interlaminar adhesion strength between the layer of the fluororesin and the layer of the thermoplastic resin. For example, the multilayer laminate of the present invention has an interlaminar adhesion strength of at least 2.0 N/cm, particularly at least 3.5 N/cm, and it also has a simple adhesive strength of at least 0.1 N/cm, particularly at least 0.5 N/cm. It is not necessarily clear about the reason why the multilayer laminate of the present invention is excellent in the interlaminar adhesion strength, but it is considered that the reason is attributable to the formation of a chemical bond between both layers, such as a formation of an imide bond which is caused by contacting the layer of the fluororesin with the layer of the thermoplastic resin in a molten state at the time of molding, whereby the acid anhydride residue contained in the fluororesin is reacted with the amino group contained in the thermoplastic resin to form an amide acid bond, followed by dehydration.

The multilayer laminate of the present invention has a laminated structure having a layer of the fluororesin containing acid anhydride residue and a layer of an amine-modified thermoplastic resin, directly laminated. The multilayer laminate of the present invention is preferably a two-layer laminate wherein the layer of the fluororesin containing acid anhydride residue and the layer of the amine-modified thermoplastic resin, directly laminated. Further, such a multilayer laminate is also preferably a multilayer laminate wherein the two-layer laminate is further laminated with a layer of another thermoplastic resin or fluororesin (other than a fluororesin containing acid anhydride residue). Further, it is also preferably a multilayer laminate having a structure having a plurality of the above two-layer laminates laminated.

The multilayer laminate of the present invention is more preferably a laminate having three or more layers, formed by laminating another thermoplastic resin on the layer of an amine-modified thermoplastic resin of said two-layer laminate. In such a case, it is possible to obtain a multilayer laminate excellent in mechanical strength or chemical barrier properties at a low cost. Such another thermoplastic resin may, for example, be a polyester such as polyethylene terephthalate, polybutylene terephthalate, polyethylene naphthalate or polybutylene naphthalate, a polyolefin such as polyethylene or polypropylene, an ethylene/vinyl acetate copolymer, polyvinyl acetate, polyvinyl alcohol, an ethylene/vinyl alcohol copolymer, polystyrene, polyvinylidene chloride, polyacrylonitrile, polyoxymethylene, polyphenylene sulfide, polyphenylene ether, polycarbonate, polyamide imide, polyimide, polyetherimide, polysulfone, polyarylate or polyamide.

Further, the multilayer laminate of the present invention is more preferably a laminate having three or more layers, formed by laminating other fluororesins on the layer of a fluororesin containing acid anhydride residue of said two-layer laminate. In such a case, it is possible to obtain a multilayer laminate further excellent in fuel barrier properties and chemical barrier properties. As specific examples of such other fluororesins, a TFE/E type copolymer, a TFE/HFP type copolymer, a TFE/PPVE type copolymer, a TFE/VDF/HFP type copolymer, a TFE/VDF type copolymer and a CTFE/E type copolymer, may be mentioned.

The thickness of the multilayer laminate of the present invention is preferably from 10 µm to 2 cm, more preferably from 50 µm to 1 cm. Further, the thickness of the layer made of a fluororesin containing acid anhydride residue is preferably from 5 µm to 5,000 µm, more preferably from 50 µm to 500 µm. Further, the thickness of the layer made of an amine-modified thermoplastic resin is preferably from 5 µm to 1.5 cm, more preferably from 50 µm to 1 cm.

Now, the present invention will be described with reference to Examples and Comparative Examples, but it should be understood that the present invention is by no means restricted thereto. Here, the evaluation method for the interlaminar adhesion strength is as follows.

Interlaminar Adhesion Strength (N/cm)

A two-layer laminate hose was cut lengthwise to prepare a strip sample of 8 mm×15 cm. One end of the sample thus prepared was peeled between the inner layer and the outer layer, and the peeled end portions were fixed to chucks of a tensile tester (manufactured by ORIENTEC CO., LTD.) and subjected to 180°0 peeling, whereby the peel strength at that time was regarded as the interlaminar adhesion strength.

Simple Adhesion Strength (N/cm)

A fluororesin film having an acid anhydride group having a thickness of 100 µm and an amine-modified polyphenylene sulfide film, obtained by press molding, were overlaid one on the other, and by means of an impulse heat-sealer, both films are hot-welded to obtain a laminate film. Ends of the laminate film not so hot-welded were fixed to chucks of a tensile tester (manufactured by ORIENTEC CO., LTD.) and subjected to 180° peeling, whereby the peel strength at that time was regarded as the simple adhesion strength.

PREPARATION EXAMPLE 1

6.0 kg of polyphenylene sulfide (LD-10 manufactured by Dainippon Ink and Chemicals, Incorporated, melt viscosity: 1,000 Pa·s, hereinafter referred to as PPS1) and 143 g of N-(2-aminoethyl)-3-aminopropyltrimethoxysilane (KBM-603 manufactured by Shin-Etsu Chemical Co., Ltd., hereinafter referred to as KBM-603) as a silane coupling agent having an amino group were mixed sufficiently, and then such a mixture was extruded by a twin-screw extruder having a cylinder temperature set at 300° C. to obtain 4.8 kg of pellets (hereinafter referred to as pellets 1) of an amine-modified polyphenylene sulfide (hereinafter referred to as PPS2). In the infrared absorption spectrum of PPS2, an absorption attributable to an amino group was observed at 3,300 $cm^{-1}$.

PREPARATION EXAMPLE 2

Into a stainless steel autoclave having an internal capacity of 500 ml, 128.8 g of N-methylpyrrolidone (hereinafter referred to as NMP), 117.2 g of $Na_2S.9H_2O$ and 0.16 g of NaOH were charged, and while nitrogen was supplied, the internal temperature was raised to 205° C. over a period of about 2 hours to carry out dehydration. Then, the autoclave was cooled to 150° C., and liquid obtained by dissolving 70 g of 1,4-dichlorobenzene and 8 g of 2,5-dichloroaniline in 40 g of NMP, was added thereto, and then the internal temperature was raised to 250° C. over a period of 1 hour, followed by a reaction at 250° C. for 2 hours. After the autoclave was cooled to room temperature, the content was washed with hot water of 60° C. and then dried at 100° C. The solid content obtained was annealed at 220° C. for 1 hour to obtain polyphenylene sulfide (hereinafter referred to as PPS3). In the infrared absorption spectrum of PPS3, an absorption attributable to an amino group was observed at 3,370 $cm^{-1}$.

PREPARATION EXAMPLE 3

39 g of polyphenylene sulfide (LC-5 manufactured by Dainippon Ink and Chemicals, Incorporated, melt viscosity: 300 Pa·s) and 0.93 g of KBM-603 were melt-kneaded by Labo Plastomill (manufactured by Toyo Seiki Seisaku-Sho, Ltd.) for 2 minutes at 300° C. at 70 rpm to obtain an amine-modified polyphenylene sulfide (hereinafter referred to as PPS4).

EXAMPLE 1

As a fluororesin containing acid anhydride residue, a TFE/E copolymer containing itaconic anhydride residue (copolymer composition: polymerized units based on TFE/polymerized units based on E/polymerized units based on itaconic anhydride/polymerized units based on $C_2F_5CH=CH_2=58.1/39.0/0.8/2.1$ (molar ratio) (hereinafter referred to as a fluororesin 1) was used.

Pellets 1 were supplied to a cylinder to form an outer layer, fluororesin 1 was supplied to a cylinder to form an inner layer, and they were, respectively transferred to transport zones of the respective cylinders. The heating temperatures in the transport zones of the pellets 1 and the fluororesin 1 were kept at 300° C., and co-extrusion was carried out while the temperature of a cross head die was kept at 300° C. to obtain a two-layer laminate hose. The laminate hose had an outer diameter of 8 mm, an inner diameter of 6 mm and a thickness of 1 mm, and the outer layer of PPS2 and the inner diameter of the fluororesin 1 had thicknesses of 0.5 mm and 0.5 mm, respectively. The interlaminar adhesion strength in the laminate hose was 4.5 N/cm.

COMPARATIVE EXAMPLE 1

A two layer laminate hose was obtained in the same manner as in Example 1 except that the pellets 1 were changed to PPS1.

The laminate hose had an outer diameter of 8 mm, an inner diameter of 6 mm and a thickness of 1 mm, and the outer layer of PPS1 and the inner layer of fluororesin 1 had thicknesses of 0.5 mm and 0.5 mm, respectively. The outer layer and the inner layer of the laminate hose were not bonded at all, and the interlaminar adhesion strength was 0 N/cm.

EXAMPLES 2 TO 4

The simple adhesive strength between the film of fluororesin 1 and the film of PPS3 or PPS4 was measured. The simple adhesive strength between fluororesin 1 and PPS 3 was 0.7 N/cm, and the simple adhesive strength between fluororesin 1 and PPS4 was 8.1 N/cm.

COMPARITIVE EXAMPLE 2

Measurement of the simple adhesive strength between the film of fluororesin 1 and the film of PPS1 was attempted, but both films were not bonded at all and readily peeled, whereby it was impossible to measure the peel strength.

INDUSTRIAL APPLICABILITY

The multilayer laminate of the present invention can be formed into various forms of e.g. a sheet, a tube, a hose, a tank and a bottle. Especially, such a multilayer laminate is suitable for a fuel transfer hose, a fuel tank, a protective film, a carrier film, a film for a layer structure, a release film or a cure sheet.

The entire disclosure of Japanese Patent Application No. 2004-5585 filed on Jan. 13, 2004 including specification, claims and summary is incorporated herein by reference in its entirety.

What is claimed is:

1. A multilayer laminate comprising a laminate structure having a layer of a fluororesin comprising acid anhydride residues and a layer of an amine-modified thermoplastic resin, directly laminated; wherein
the fluororesin is a polymer of tetrafluoroethylene, ethylene, $CH_2=CH(CF_2)_2F$ and at least one acid anhydride having a polymerizable unsaturated bond selected from the group consisting of itaconic anhydride, citraconic anhydride and 5-norbornene-2,3-dicarboxylic anhydride;
one or more repeating units based on the at least one acid anhydride are in the main chain of the fluororesin; and
the amine-modified thermoplastic resin is produced by melt-kneading a silane coupling agent having an amino group with a thermoplastic resin, the thermoplastic resin being polyphenylene sulfide.

2. The multilayer laminate according to claim 1, wherein the content of the acid anhydride residue in the fluororesin is from 0.01 to 3 mol % based on the total polymerized units constituting the fluororesin.

3. The multilayer laminate according to claim 1, wherein the multilayer laminate is a fuel transfer hose.

4. A method for producing the multilayer laminate as defined in claim 1, characterized by subjecting the fluororesin containing acid anhydride residue and the amine-modified thermoplastic resin to co-extrusion.

5. The multilayer laminate according to claim 1, wherein the content of the acid anhydride residue in the fluororesin is from 0.05 to 2 mol % based on the total polymerized units constituting the fluororesin.

6. The multilayer laminate according to claim 1, wherein the content of the acid anhydride residue in the fluororesin is from 0.1 to 1 mol % based on the total polymerized units constituting the fluororesin.

7. The multilayer laminate according to claim 1, wherein the fluororesin has a volume flow rate from 0.1 to 1,000 $mm^3/sec$.

8. The multilayer laminate according to claim 1, wherein the fluororesin has a volume flow rate from 5 to 500 $mm^3/sec$.

9. The multilayer laminate according to claim 1, wherein the fluororesin has a volume flow rate from 10 to 200 $mm^3/sec$.

10. The multilayer laminate according to claim 3, wherein the fuel transfer hose comprises an inner surface with a surface resistivity of at most $1 \times 10^9$ Ω/□.

11. The multilayer laminate according to claim 3, wherein the fuel transfer hose comprises an inner surface with a surface resistivity of at most $1 \times 10^5$ Ω/□.

12. The multilayer laminate according to claim 1, wherein the multilayer laminate has an interlaminar adhesion strength of a least 2.0 N/cm.

13. The multilayer laminate according to claim 1, wherein the multilayer laminate has an interlaminar adhesion strength of a least 3.5 N/cm.

14. The multilayer laminate according to claim 1, wherein the multilayer laminate has a thickness from 10 μm to 2 cm.

15. The multilayer laminate according to claim 1, wherein the multilayer laminate has a thickness from 50 μm to 1 cm.

16. The multilayer laminate according to claim 1, wherein the fluororesin layer has a thickness from 5 μm to 500 μm.

17. The multilayer laminate according to claim 1, wherein the fluororesin layer has a thickness from 50 μm to 500 μm.

18. The multilayer laminate according to claim 1, wherein the amine-modified thermoplastic resin layer has a thickness from 5 μm to 1.5 cm.

19. The multilayer laminate according to claim 1, wherein the amine-modified thermoplastic resin layer has a thickness from 50 μm to 1 cm.

* * * * *